(12) United States Patent
Huang

(10) Patent No.: US 10,571,738 B2
(45) Date of Patent: Feb. 25, 2020

(54) DISPLAY PANEL AND METHOD FOR MANUFACTURING THE SAME

(71) Applicants: HKC Corporation Limited, Shenzhen, Guangdong (CN); Chongqing HKC Optoelectronics Technology Co., Ltd., Chongqing (CN)

(72) Inventor: Shishuai Huang, Chongqing (CN)

(73) Assignees: HKC CORPORATION LIMITED, Shenzhen, Guangdong (CN); CHONGGING HKC OPTOELECTRONICS TECHNOLOGY CO., LTD., Chongging (CN)

( * ) Notice: Subject to any disclaimer, the term of this patent is extended or adjusted under 35 U.S.C. 154(b) by 35 days.

(21) Appl. No.: 15/550,952

(22) PCT Filed: Apr. 28, 2017

(86) PCT No.: PCT/CN2017/082366
§ 371 (c)(1),
(2) Date: Aug. 14, 2017

(87) PCT Pub. No.: WO2018/188128
PCT Pub. Date: Oct. 18, 2018

(65) Prior Publication Data
US 2018/0292708 A1   Oct. 11, 2018

(30) Foreign Application Priority Data
Apr. 10, 2017  (CN) .......................... 2017 1 0229519

(51) Int. Cl.
G02F 1/1335   (2006.01)
G02F 1/1368   (2006.01)
G02F 1/1345   (2006.01)

(52) U.S. Cl.
CPC .... G02F 1/133528 (2013.01); G02F 1/13454 (2013.01); G02F 1/1368 (2013.01);
(Continued)

(58) Field of Classification Search
CPC ......... G02F 1/133528; G02F 1/133514; G02F 1/1368; G02F 1/133512; G02F 1/133516;
(Continued)

(56) References Cited

U.S. PATENT DOCUMENTS

2005/0128394 A1   6/2005  Lee et al.
2012/0100466 A1*  4/2012  Hashimoto ............... G03F 1/46
430/5

(Continued)

FOREIGN PATENT DOCUMENTS

CN   102998838 A   3/2013
CN   203811940 U   9/2014

(Continued)

*Primary Examiner* — Stephone B Allen
*Assistant Examiner* — Adam W Booher

(57) ABSTRACT

This application relates to a display panel and a method for manufacturing same. The display panel includes a display area and bezel areas, and includes: a first substrate, including an outer surface; a second substrate, including an outer surface, and disposed opposite to the first substrate; a first polarizer, disposed on the outer surface of the first substrate; a second polarizer, disposed on the outer surface of the second substrate; and an auxiliary polarizer, disposed on a periphery of an outer surface of the second polarizer, and covering a bezel area. Polarization directions of the auxiliary polarizer and the second polarizer are perpendicular to each other.

8 Claims, 8 Drawing Sheets

(52) U.S. Cl.
CPC ............... *G02F 1/133514* (2013.01); *G02F 2001/133531* (2013.01); *G02F 2001/133538* (2013.01)

(58) Field of Classification Search
CPC ....... G02F 1/1335; G02F 2001/133538; G02F 2001/133531; G02F 2001/13356; G02F 2001/133562; G02B 5/30; G02B 27/28; G02B 27/281; G02B 27/288
See application file for complete search history.

(56) References Cited

U.S. PATENT DOCUMENTS

| | | | | |
|---|---|---|---|---|
| 2013/0323628 A1* | 12/2013 | Light | ........................ | G03F 1/50 430/5 |
| 2016/0238881 A1* | 8/2016 | Chong | ................. | G02B 6/0011 |
| 2017/0322447 A1* | 11/2017 | Lu | ..................... | G02F 1/133512 |

FOREIGN PATENT DOCUMENTS

| CN | 104122704 A | | 10/2014 |
|---|---|---|---|
| CN | 102998838 B | * | 1/2015 |

\* cited by examiner

DISPLAY PANEL AND METHOD FOR MANUFACTURING THE SAME

BACKGROUND

Technical Field

This application relates to a manufacturing method, and in particular, to a display panel and a method for manufacturing same.

Related Art

With progress of technologies, liquid crystal displays (LCDs) with various advantages, such as power saving, no radiation, small volumes, low power consumption, flat panels, high resolution, and stable picture quality, in particular, various current information products, such as mobile phones, notebook computers, digital cameras, PDAs, and liquid crystal screens, are becoming more popular. Accordingly, the demand for LCDs increases greatly. Therefore, a thin film transistor liquid crystal display (TFT-LCD) that satisfies the pixel design that has an increasing demand for high resolution and has superior attributes such as high picture quality, high space utilization efficiency, low power consumption, and no radiation has gradually become the mainstream of the market. A TFT substrate is one of important components for assembling an LCD.

In addition, TFT substrates are further divided into opposite substrates having red, green, and blue photoresist layers (RGB on CF), in-plane switching (IPS mode) liquid crystal panels having red, green, and blue photoresist layers (RGB on Array), and vertical alignment (VA mode) liquid crystal panels having red, green, and blue photoresist layers (RGB on Array).

A liquid crystal display device is usually constructed in the following way: an opposite substrate including a drive component is disposed opposite to a color filter (CF) and a periphery is sealed, and a liquid crystal material is filled in a gap therein. In addition, the liquid crystal material has refractive index anisotropy, and may switch between on and off states and display pixels according to a difference between a state of regular arrangement in a manner of being along a direction in which a voltage is applied to the liquid crystal material and a state in which a voltage is not applied. Herein, an alignment film is disposed on substrates clamping the liquid crystal material, to align the liquid crystal material. In addition, LCDs are the most widely used displays in the current market, and in particular, are widely applied to liquid crystal televisions. For liquid crystal televisions, consumers not only purse higher definition, but also have higher requirements for appearance, such as a lighter and thinner design, a narrow bezel, and a curved surface. Consumers and panel designers always pursue bezel-less panels. In a general sense, bezel-less refers to that there is no adhesive frame outside the panel, and glass is directly attached on the backlight. A chip on film on a gate side is removed from a gate driver product; a timing driver circuit is made on a glass substrate of a TFT, so that an adhesive frame is not needed to protect the chip on film on the gate side, and therefore a bezel-less design can be achieved. A liquid crystal television uses an amorphous-silicon (a-Si) semiconductor technology and when transistors are used as a timing driver circuit, the size is large, wiring is complex, and a large quantity of parasitic capacitors are included. Therefore, a gate driver circuit has an extremely great risk of optical current leakage, and long-time illumination makes the reliability of the gate driver circuit fail, and consequently, the panel is faulty in display, and has short service life. In particular, when relevant technologies are used, a-Si remains below data lines; backlight emitted from a back side is directly illuminated onto the a-Si after passing through a lower polarizer, and the risk of optical current leakage is great.

SUMMARY

To resolve the foregoing technical problem, an objective of this application is to provide a display panel and a method for manufacturing same, so that the problem of optical current leakage in a gate driver circuit of a product is resolved, and the reliability and service life of the product can be improved.

The objective of this application is achieved and the technical problem thereof is resolved by using the following technical solutions. A display panel provided according to this application comprises a display area and bezel areas, where the display panel comprises: a first substrate, comprising an outer surface; a second substrate, comprising an outer surface, and disposed opposite to the first substrate; a first polarizer, disposed on the outer surface of the first substrate; a second polarizer, disposed on the outer surface of the second substrate; and an auxiliary polarizer, disposed on a periphery of an outer surface of the second polarizer, and covering a bezel area, where polarization directions of the auxiliary polarizer and the second polarizer are perpendicular to each other.

In an embodiment of this application, the bezel areas comprise a gate driver area, and the auxiliary polarizer covers the gate driver area.

In an embodiment of this application, the auxiliary polarizer extends and deflects from a periphery of the first polarizer towards the second polarizer, and the auxiliary polarizer is attached on the periphery of the outer surface of the second polarizer.

In an embodiment of this application, a cross section of the auxiliary polarizer is L-shaped, and the auxiliary polarizer is disposed on the periphery of the outer surface of the second polarizer, and extends towards a side edge of the second substrate.

In an embodiment of this application, each of the first polarizer, the second polarizer, and the auxiliary polarizer comprises a polarizing material layer, and a refractive index of the polarizing material layer is in a range of 2.0 to 3.2.

In an embodiment of this application, the first substrate faces towards a backlight module, and the second substrate faces towards a user.

This application may further resolve the technical problem thereof by using the following technical measures.

Another objective of this application is to provided a method for manufacturing a display panel, comprising: providing a first substrate and a second substrate disposed opposite to each other; disposing a first polarizer on the first substrate; disposing a second polarizer on the second substrate; and disposing an auxiliary polarizer on a periphery of an outer surface of the second polarizer.

In an embodiment of this application, according to the manufacturing method, the auxiliary polarizer extends and deflects from a periphery of the first polarizer towards the second polarizer, and the auxiliary polarizer is attached on the periphery of the outer surface of the second polarizer.

In an embodiment of this application, according to the manufacturing method, the first polarizer encloses side edges of the first substrate and the second substrate.

In an embodiment of this application, according to the manufacturing method, the auxiliary polarizer is attached on the periphery of the outer surface of the second polarizer, and extends towards the side edge of the second substrate, and a cross section of the auxiliary polarizer is L-shaped.

In an embodiment of this application, according to the manufacturing method, polarization directions of the auxiliary polarizer and the second polarizer are perpendicular to each other.

In an embodiment of this application, according to the manufacturing method, each of the first polarizer, the second polarizer, and the auxiliary polarizer comprises a polarizing material layer, and a refractive index of the polarizing material layer is in a range of 2.0 to 3.2.

Another objective of this application is to provide a display panel, comprising a display area and bezel areas, where the display panel comprises: a first substrate, comprising an outer surface; a second substrate, comprising an outer surface, and disposed opposite to the first substrate; a first polarizer, disposed on the outer surface of the first substrate; a second polarizer, disposed on the outer surface of the second substrate; and an auxiliary polarizer, disposed on a periphery of an outer surface of the second polarizer, and covering a bezel area. The auxiliary polarizer extends and deflects from a periphery of the first polarizer towards the second polarizer, and the auxiliary polarizer is attached on the periphery of the outer surface of the second polarizer; a cross section of the auxiliary polarizer is L-shaped; the auxiliary polarizer is disposed on the periphery of the outer surface of the second polarizer, and extends towards a side edge of the second substrate; and polarization directions of the auxiliary polarizer and the second polarizer are perpendicular to each other. The first substrate is a CF substrate; the second substrate is a TFT substrate; the first substrate faces towards a backlight module; and the second substrate faces towards a user.

This application resolves the problem of optical current leakage in a gate driver circuit of a product, and can improve the reliability and service life of the product.

DETAILED DESCRIPTION

The following embodiments are described with reference to the accompanying drawings, which are used to exemplify specific embodiments for implementation of this application. Terms about directions mentioned in this application, such as "on", "below", "front", "back", "left", "right", "in", "out", and "side surface" merely refer to directions of the accompanying drawings. Therefore, the used terms about directions are used to describe and understand this application, and are not intended to limit this application.

The accompanying drawings and the description are considered to be essentially exemplary, rather than limitative. In figures, units with similar structures are represented by using the same reference number. In addition, for understanding and ease of description, the size and the thickness of each component shown in the accompanying drawings are arbitrarily shown, but this application is not limited thereto.

In the accompanying drawings, for clarity, thicknesses of a layer, a film, a panel, an area, and the like are enlarged. In the accompanying drawings, for understanding and ease of description, thicknesses of some layers and areas are enlarged. It should be understood that when a component such as a layer, a film, an area, or a base is described to be "on" "another component", the component may be directly on the another component, or there may be an intermediate component.

In addition, in this specification, unless otherwise explicitly described to have an opposite meaning, the word "include" is understood as including the component, but not excluding any other component. In addition, in this specification, "on" means that a component is located on or below a target component, but does not mean that the component needs to be located on top of the gravity direction.

To further describe the technical means adopted in this application to achieve the desired inventive objective and effects thereof, specific implementations, structures, features, and effects of a display panel and a method for manufacturing same provided according to this application are described below in detail with reference to the drawings and preferred embodiments.

A liquid crystal display panel of this application may include a TFT substrate, a CF substrate, and a liquid crystal layer disposed between the two substrates.

In an embodiment, the liquid crystal display panel of this application may be a curved-surface display panel.

In an embodiment, a TFT and a CF of this application may be disposed on a same substrate.

Figure 1A:
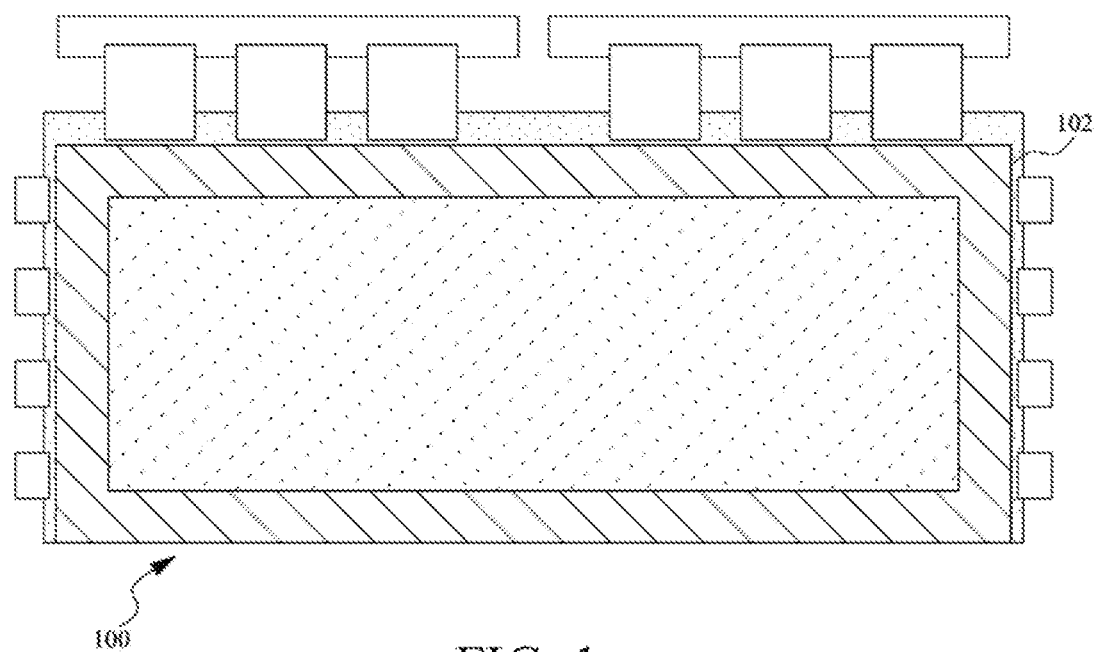
FIG. 1a is a schematic diagram of an exemplary display.

FIG. 1a is a schematic diagram of an exemplary display. Referring to FIG. 1a, a display 100 includes an adhesive material 102 for protecting side leakage of light on an edge of a bezel of the display 100, to prevent the phenomenon of peripheral light leakage.

Figure 1B:
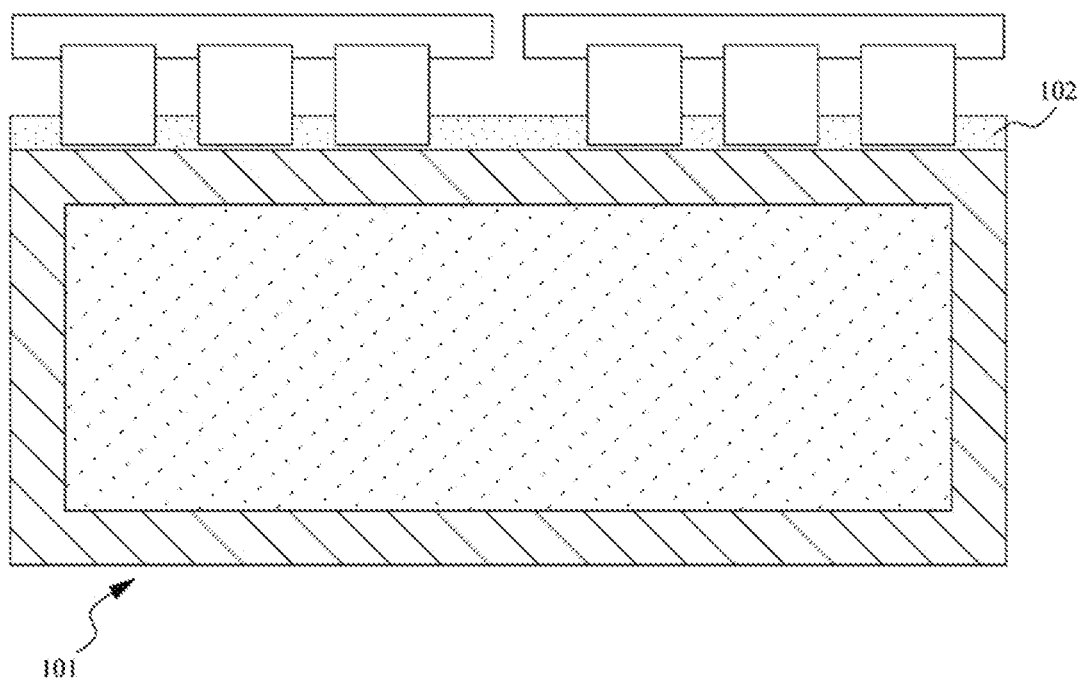
FIG. 1b is a schematic diagram of a display according to an embodiment of this application.

FIG. 1b is a schematic diagram of a display according to an embodiment of this application. Referring to FIG. 1b, in an embodiment of this application, a bezel of a bezel-less display 101 does not need to be protected by an adhesive material 102.

Figure 2:
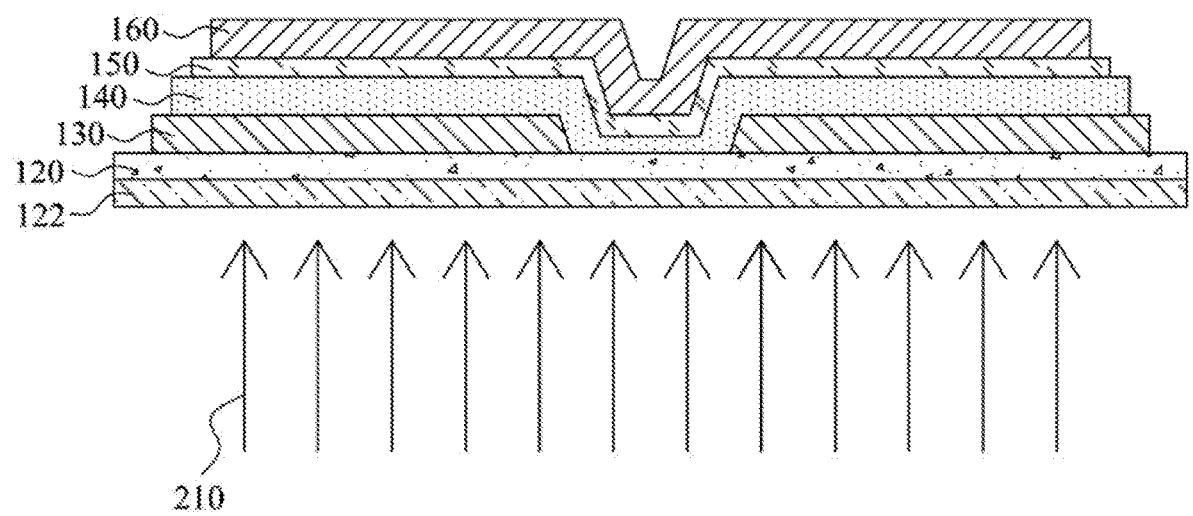
FIG. 2 is a schematic cross-sectional view of an exemplary TFT substrate.
Figure 3:
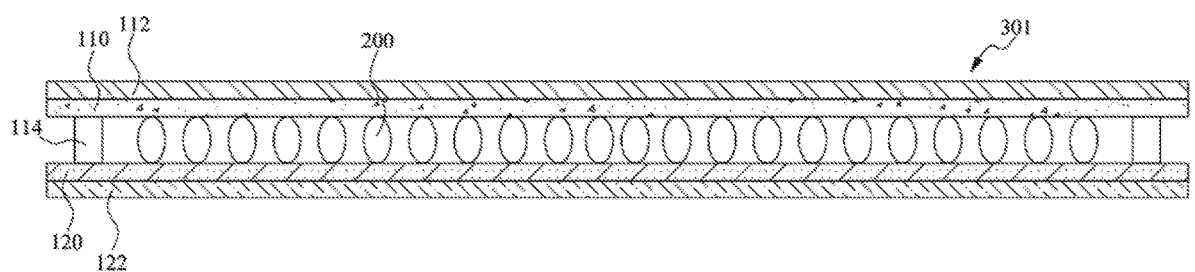
FIG. 3 is a schematic cross-sectional view of an exemplary display panel.

FIG. 2 is a schematic cross-sectional view of an exemplary TFT substrate and FIG. 3 is a schematic cross-sectional view of an exemplary display panel. Referring to FIG. 2 and FIG. 3, a display panel 301 includes a second substrate 120, which is a TFT substrate, a gate driver area, a second polarizer 122, a sealant 114, a first substrate 110, which is a CF substrate, a first polarizer 112, and a liquid crystal layer 200. The second polarizer 122 is disposed on an outer surface of the TFT substrate 120, and the first polarizer 112 is disposed on an outer surface of the CF substrate 110. The gate driver area includes: a plurality of scanning lines 130, disposed on the TFT substrate 120; a passivation layer 140, disposed on the TFT substrate 120, and covering the scanning lines 130; an a-Si layer 150, disposed on the passivation layer 140; and a plurality of data lines 160, disposed on the a-Si layer 150. The data lines 160 and the scanning lines 130 define a plurality of pixel areas.

In an embodiment, light beam 210 passing through the second polarizer 122 may be illuminated onto the gate driver area, and the risk of optical current leakage exists.

In an embodiment, each of the polarizers 112 and 122 includes a polarizing material layer. Preferably, a value of a refractive index of the polarizing material layer is in a range of 2.0 to 3.2, and a value of an extinction coefficient of the polarizing material layer is in a range of 2.7 to 3.5, to make an extinction ratio excellent. Specifically, a molybdenum silicide material (sometimes referred to as an MoSi material below) containing molybdenum (Mo) and silicon (Si), a nitrided molybdenum silicide material, or the like may be listed as a polarizing material having such a refractive index and extinction coefficient, preferably, the molybdenum silicide material is used as the polarizing material. The reason lies in that the values of the refractive index and the extinction coefficient can be easily adjusted according to contents of elements such as Mo, Si, nitrogen, and oxygen contained in the molybdenum silicide material, and the foregoing refractive index and extinction coefficient can be easily satisfied under the wavelength of an ultraviolet area. The reason lies in that the molybdenum silicide material also has optical rotation for short wavelengths of the ultraviolet area, and is adapted for alignment of an optical alignment film of a liquid crystal display device.

Figure 4:
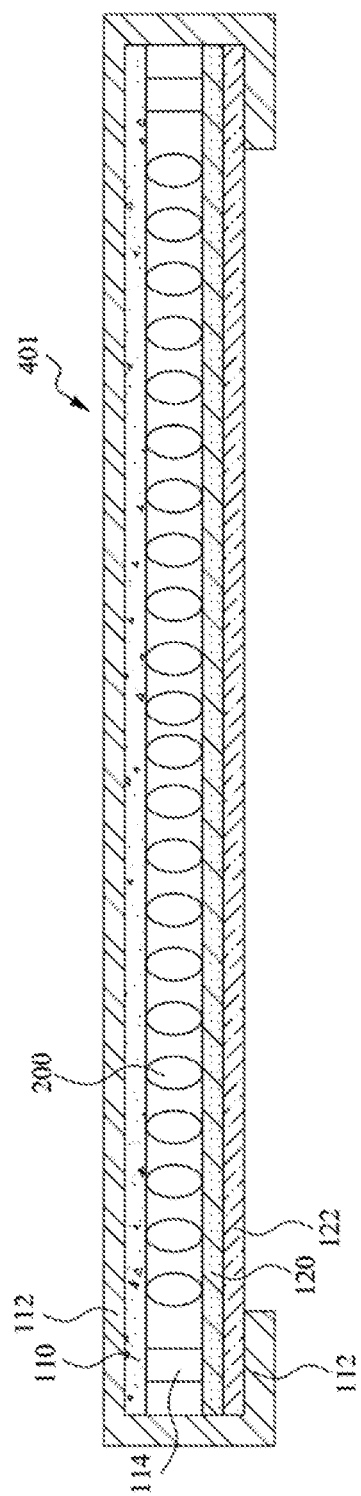
FIG. 4 is a schematic cross-sectional view of a display panel according to an embodiment of this application.
Figure 5:
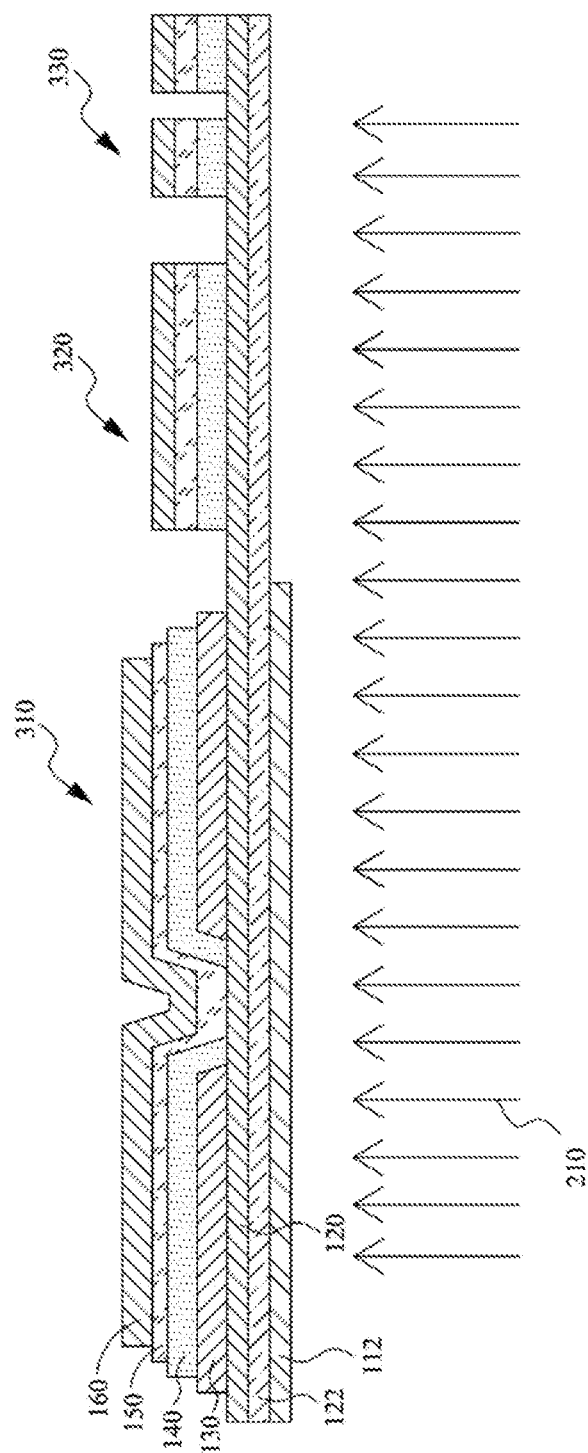
FIG. 5 is a schematic cross-sectional view of a TFT substrate according to an embodiment of this application.

FIG. 4 is a schematic cross-sectional view of a display panel according to an embodiment of this application and FIG. 5 is a schematic cross-sectional view of a TFT substrate according to an embodiment of this application. Referring to FIG. 4 and FIG. 5, in an embodiment of this application, a display panel 401 includes a display area 330 and bezel areas 310 and 320. The display panel 401 includes: a second substrate 120, which is a TFT substrate, a second polarizer 122, a sealant 114, a first substrate 110, which is a CF substrate, a first polarizer 112, and a liquid crystal layer 200. The second polarizer 122 is disposed on an outer surface of the second substrate 120. The first polarizer 112 is disposed on an outer surface of the first substrate 110. An auxiliary polarizer 124 is disposed on a periphery of an outer surface of the second polarizer 122 and covers a bezel area.

In an embodiment, the bezel areas 310 and 320 include a gate driver area 310 and a wiring area 320. The gate driver area 310 includes: a plurality of scanning lines 130, disposed on the TFT substrate 120; a passivation layer 140, disposed on the TFT substrate 120, and covering the scanning lines 130; an a-Si layer 150, disposed on the passivation layer 140; and a plurality of data lines 160, disposed on the a-Si layer 150. The data lines 160 and the scanning lines 130 define a plurality of pixel areas.

In an embodiment, the auxiliary polarizer 124 covers the gate driver area 310.

In an embodiment, the auxiliary polarizer 124 extends and deflects from a periphery of the first polarizer 112 towards the second polarizer 122, and the auxiliary polarizer is attached on the periphery of the outer surface of the second polarizer 122. The auxiliary polarizer 124 can protect side edges of the TFT substrate 120 and the CF substrate 110, and has a certain cushioning function for external impacts or collisions.

In an embodiment, polarization directions of the auxiliary polarizer 124 and the second polarizer 122 are perpendicular to each other.

In an embodiment, the first substrate 110 faces towards a backlight module, and the second substrate faces towards a user.

In an embodiment, the CF substrate 110 and the TFT substrate 120 are disposed opposite to each other.

In an embodiment, the liquid crystal layer 200 is disposed between the TFT substrate 120 and the CF substrate 110.

In an embodiment, the sealant 114 is disposed in the bezel areas 310 and 320 of the display panel 401, to connect the TFT substrate 120 and the CF substrate 110.

In an embodiment, the polarizer 122 below the wiring area 320 and the display area 330 is not affected, and normal display of the display area 330 is not affected.

In an embodiment, by means of the design that the polarization directions of the second polarizer 122 and the auxiliary polarizer 124 are perpendicular to each other, a light beam 210 cannot be transmitted into the gate driver area 310, and therefore the risk of optical current leakage does not exist in the gate driver area 310.

Figure 6:
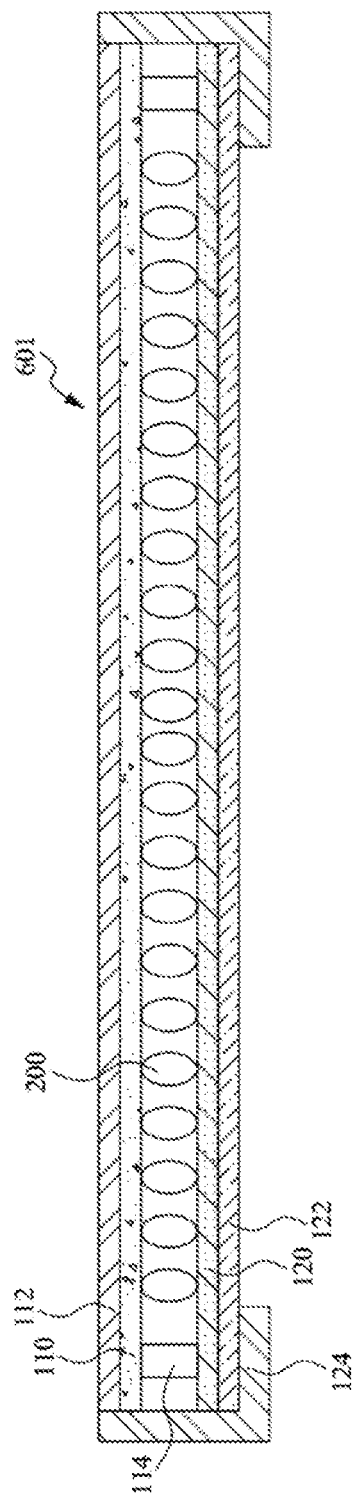
FIG. 6 is a schematic cross-sectional view of a display panel according to another embodiment of this application.
Figure 7:
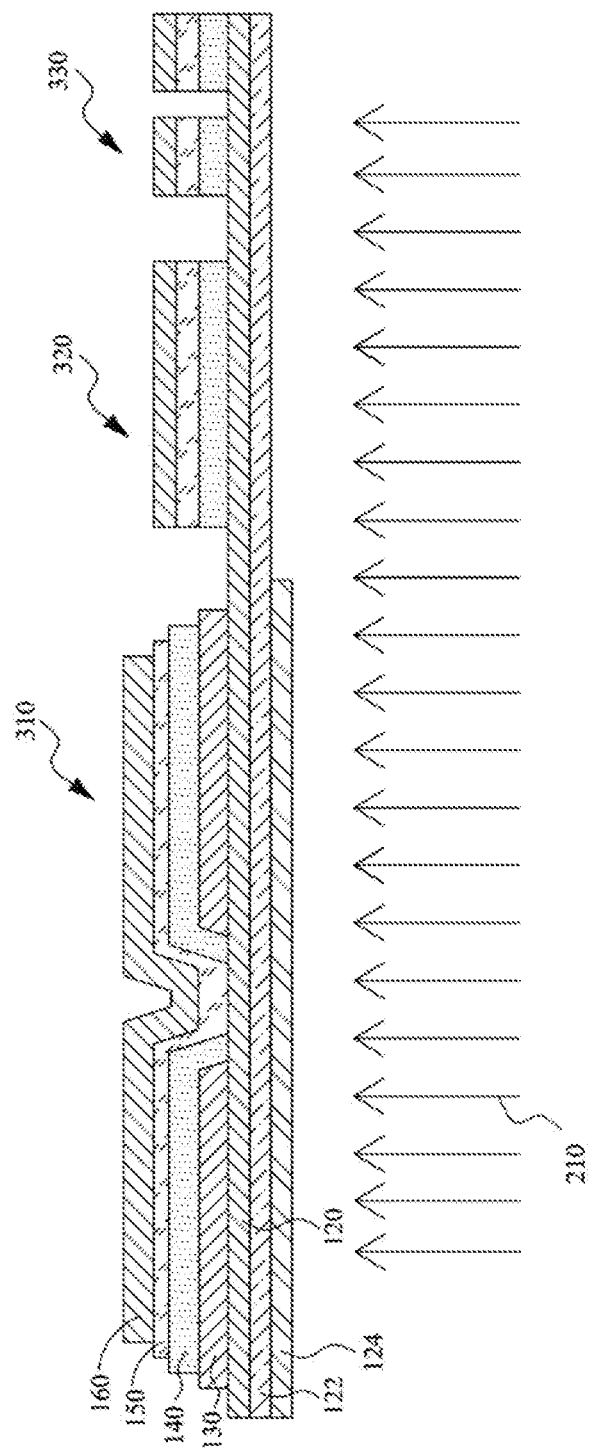
FIG. 7 is a schematic cross-sectional view of a TFT substrate according to another embodiment of this application.

FIG. 6 is a schematic cross-sectional view of a display panel according to another embodiment of this application and FIG. 7 is a schematic cross-sectional view of a TFT substrate according to another embodiment of this application. Referring to FIG. 6 and FIG. 7, in an embodiment of this application, a display panel 601 includes a display area 330 and bezel areas 310 and 320. The display panel 601 includes: a second substrate 120, which is a TFT substrate, a second polarizer 122, a sealant 114, a first substrate 110, which is a CF substrate, a first polarizer 112, and a liquid crystal layer 200. The second polarizer 122 is disposed on an outer surface of the second substrate 120. The first polarizer 112 is disposed on an outer surface of the first substrate 110. An auxiliary polarizer 124 is disposed on a periphery of an outer surface of the second polarizer 122 and covers a bezel area.

In an embodiment, the bezel areas 310 and 320 include a gate driver area 310 and a wiring area 320. The gate driver area 310 includes: a plurality of scanning lines 130, disposed on the TFT substrate 120; a passivation layer 140, disposed on the TFT substrate 120, and covering the scanning lines 130; an a-Si layer 150, disposed on the passivation layer 140; and a plurality of data lines 160, disposed on the a-Si layer 150. The data lines 160 and the scanning lines 130 define a plurality of pixel areas.

In an embodiment, the auxiliary polarizer 124 covers the gate driver area 310.

In an embodiment, a cross section of the auxiliary polarizer 124 is L-shaped and the auxiliary polarizer 124 is disposed on the periphery of the outer surface of the second polarizer 122, encloses a side edge of the second substrate 120, and may even cover a side edge of the first substrate 110. The auxiliary polarizer 124 can protect side edges of the TFT substrate 120 and the CF substrate 110, and has a certain cushioning function for external impacts or collisions.

In an embodiment, polarization directions of the auxiliary polarizer 124 and the second polarizer 122 are perpendicular to each other.

In an embodiment, the CF substrate 110 and the TFT substrate 120 are disposed opposite to each other.

In an embodiment, the liquid crystal layer 200 is disposed between the TFT substrate 120 and the CF substrate 110.

In an embodiment, the sealant 114 is disposed in the bezel areas 310 and 320 of the display panel 601, to connect the TFT substrate 120 and the CF substrate 110.

In an embodiment, the polarizer 122 below the wiring area 320 and the display area 330 is not affected, and normal display of the display area 330 is not affected.

In an embodiment, by means of the design that the polarization directions of the second polarizer 122 and the auxiliary polarizer 124 are perpendicular to each other, a light beam 210 cannot be transmitted into the gate driver area 310, and therefore the risk of optical current leakage does not exist in the gate driver area 310.

In an embodiment, each of the polarizers 112, 122, and 124 includes a polarizing material layer. Preferably, a value of a refractive index of the polarizing material layer is in a range of 2.0 to 3.2, and a value of an extinction coefficient of the polarizing material layer is in a range of 2.7 to 3.5, to make an extinction ratio excellent. Specifically, a molybdenum silicide material (sometimes referred to as an MoSi material below) containing Mo and Si, a nitrided molybdenum silicide material, or the like may be listed as a polarizing material having such a refractive index and extinction coefficient, preferably, the molybdenum silicide material is used as the polarizing material. The reason lies in that the values of the refractive index and the extinction coefficient can be easily adjusted according to contents of elements such as Mo, Si, nitrogen, and oxygen contained in the molybdenum silicide material, and the foregoing refractive index and extinction coefficient can be easily satisfied under the wavelength of an ultraviolet area. The reason lies in that the molybdenum silicide material also has optical rotation for short wavelengths of the ultraviolet area, and is adapted for alignment of an optical alignment film of a liquid crystal display device.

Referring to FIG. 4, FIG. 5, FIG. 6, and FIG. 7 again, in an embodiment of this application, a method for manufacturing a display panel includes: providing a first substrate 110 and a second substrate 120 disposed opposite to each other, where the second substrate 120 includes a gate driver area 310; disposing a plurality of scanning lines 130 on the second substrate 120; disposing a passivation layer 140 on the second substrate 120, where the passivation layer 140 covers the scanning lines 130; disposing an a-Si layer 150 on the second substrate 120, where the a-Si layer 150 covers the passivation layer 140; disposing a plurality of data lines 160 on the a-Si layer 150, where the data lines 160 and the scanning lines 130 define a plurality of pixel areas; disposing a first polarizer 112 on the first substrate 110; disposing a second polarizer 122 on the second substrate 120; and disposing an auxiliary polarizer on a periphery of an outer surface of the second polarizer 122, where the auxiliary polarizer covers the gate driver area 310. Polarization directions of the auxiliary polarizer and the second polarizer 122 are perpendicular to each other.

In an embodiment, according to the manufacturing method, the auxiliary polarizer extends and deflects from a periphery of the first polarizer 112 towards the second polarizer 122, and the auxiliary polarizer is attached on the periphery of the outer surface of the second polarizer 122.

In an embodiment, according to the manufacturing method, the first polarizer 112 encloses side edges of the first substrate 110 and the second substrate 120.

In an embodiment, according to the manufacturing method, the auxiliary polarizer 124 the auxiliary polarizer is attached on the periphery of the outer surface of the second polarizer 122, and extends towards the side edge of the second substrate 120, and may even cover the side edge of the first substrate 110.

In an embodiment, according to the manufacturing method, a cross section of the auxiliary polarizer 124 is L-shaped.

In an embodiment, according to the manufacturing method, by means of the design that the polarization directions of the second polarizer 122 and the auxiliary polarizer 124 are perpendicular to each other, a light beam 210 cannot be transmitted into the gate driver area 310, and therefore the problem of optical current leakage does not exist in the gate driver area 310.

In an embodiment, according to the manufacturing method, the auxiliary polarizer 124 encloses side edges of the first substrate 110 and the second substrate 120. The auxiliary polarizer 124 can protect side edges of the TFT substrate 120 and the CF substrate 110, and has a certain cushioning function for external impacts or collisions.

In an embodiment, according to the manufacturing method, each of the polarizers 112, 122, and 124 includes a polarizing material layer. Preferably, a value of a refractive index of the polarizing material layer is in a range of 2.0 to 3.2, and a value of an extinction coefficient of the polarizing material layer is in a range of 2.7 to 3.5, to make an extinction ratio excellent. Specifically, a molybdenum silicide material (sometimes referred to as an MoSi material below) containing Mo and Si, a nitrided molybdenum silicide material, or the like may be listed as a polarizing material having such a refractive index and extinction coefficient, preferably, the molybdenum silicide material is used as the polarizing material. The reason lies in that the values of the refractive index and the extinction coefficient can be easily adjusted according to contents of elements such as Mo, Si, nitrogen, and oxygen contained in the molybdenum silicide material, and the foregoing refractive index and extinction coefficient can be easily satisfied under the wavelength of an ultraviolet area. The reason lies in that the molybdenum silicide material also has optical rotation for short wavelengths of the ultraviolet area, and is adapted for alignment of an optical alignment film of a liquid crystal display device.

In an embodiment, according to the manufacturing method, the polarizer 122 below the wiring area 320 and the display area 330 is not affected, and normal display of the display area 330 is not affected.

This application resolves the problem of optical current leakage in a gate driver circuit of a product, and can improve the reliability and service life of the product.

Terms such as "in some embodiments" and "in various embodiments" are repeatedly used. Usually, the terms do not refer to the same embodiment; but they may also refer to the same embodiment. Words such as "include", "have", "include" are synonyms, unless other meanings are indicated in the context.

The foregoing descriptions are merely preferred embodiments of this application, and are not intended to limit this application in any form. Although this application has been disclosed above through the preferred embodiments, the embodiments are not intended to limit this application. Any person skilled in the art can make some equivalent variations or modifications according to the foregoing disclosed technical content without departing from the scope of the technical solutions of this application to obtain equivalent embodiments. Any simple amendment, equivalent change or modification made to the foregoing embodiments according to the technical essence of this application without departing from the content of the technical solutions of this application shall fall within the scope of the technical solutions of this application.

What is claimed is:

1. A display panel, comprising a display area and bezel areas, wherein the display panel comprises:
   a first substrate, comprising an outer surface;
   a second substrate, comprising an outer surface, and disposed opposite to the first substrate;

a first polarizer, disposed on the outer surface of the first substrate;

a second polarizer, disposed on the outer surface of the second substrate; and an auxiliary polarizer, disposed on a periphery of an outer surface of the second polarizer, and covering a bezel area, wherein a cross section of the auxiliary polarizer is L-shaped and the auxiliary polarizer is disposed on the periphery of the outer surface of the second polarizer, encloses a side edge of the second substrate, and covers a side edge of the first substrate, wherein a value of a refractive index of the polarizing material layer is in a range of 2.0 to 3.2, and a value of an extinction coefficient of the polarizing material layer is in a range of 2.7 to 3.5, and wherein polarization directions of the auxiliary polarizer and the second polarizer are perpendicular to each other.

2. The display panel according to claim 1, wherein the bezel areas comprise a gate driver area, and the auxiliary polarizer covers the gate driver area.

3. The display panel according to claim 1, wherein the auxiliary polarizer extends and deflects from a periphery of the first polarizer towards the second polarizer, and the auxiliary polarizer is attached on the periphery of the outer surface of the second polarizer.

4. The display panel according to claim 1, wherein the first substrate faces towards a backlight module, and the second substrate faces towards a user.

5. A method for manufacturing a display panel, comprising:

providing a first substrate and a second substrate disposed opposite to each other;

disposing a first polarizer on the first substrate;

disposing a second polarizer on the second substrate; and disposing an auxiliary polarizer on a periphery of an outer surface of the second polarizer, wherein a cross section of the auxiliary polarizer is L-shaped and the auxiliary polarizer is disposed on the periphery of the outer surface of the second polarizer, encloses a side edge of the second substrate, and covers a side edge of the first substrate, wherein a value of a refractive index of the polarizing material layer is in a range of 2.0 to 3.2, and a value of an extinction coefficient of the polarizing material layer is in a range of 2.7 to 3.5, and wherein polarization directions of the auxiliary polarizer and the second polarizer are perpendicular to each other.

6. The method for manufacturing a display panel according to claim 5, wherein the first polarizer encloses side edges of the first substrate and the second substrate.

7. The method for manufacturing a display panel according to claim 5, wherein the auxiliary polarizer is attached on the periphery of the outer surface of the second polarizer, and extends towards the side edge of the second substrate.

8. A display panel, comprising a display area and bezel areas, wherein the display panel comprises:

a first substrate, comprising an outer surface;

a second substrate, comprising an outer surface, and disposed opposite to the first substrate;

a first polarizer, disposed on the outer surface of the first substrate;

a second polarizer, disposed on the outer surface of the second substrate; and an auxiliary polarizer, disposed on a periphery of an outer surface of the second polarizer, and covering a bezel area, wherein the auxiliary polarizer extends and deflects from a periphery of the first polarizer towards the second polarizer, and the auxiliary polarizer is attached on the periphery of the outer surface of the second polarizer;

a cross section of the auxiliary polarizer is L-shaped, and the auxiliary polarizer is disposed on the periphery of the outer surface of the second polarizer, and extends towards a side edge of the second substrate;

polarization directions of the auxiliary polarizer and the second polarizer are perpendicular to each other; and the first substrate is a color filter (CF) substrate, the second substrate is a thin film transistor (TFT) substrate, the first substrate faces towards a backlight module, and the second substrate faces towards a user; and a value of a refractive index of the polarizing material layer is in a range of 2.0 to 3.2, and a value of an extinction coefficient of the polarizing material layer is in a range of 2.7 to 3.5.

* * * * *